United States Patent

[11] 3,584,719

| [72] | Inventor | Bobby G. Upchurch |
| | | Ortonville, Mich. |
| [21] | Appl. No. | 879,493 |
| [22] | Filed | Nov. 24, 1969 |
| [45] | Patented | June 15, 1971 |
| [73] | Assignee | General Motors Corporation |
| | | Detroit, Mich. |

[54] CLUTCH WITH PRESSURE PLATE HAVING CONVEX FRICTION FACE
14 Claims, 3 Drawing Figs.

[52] U.S. Cl. ................................................ 192/70.14, 192/107
[51] Int. Cl. .................................................. F16d 13/70
[50] Field of Search ........................................ 192/107, 70.14, 70.15

[56] References Cited
UNITED STATES PATENTS

| 835,373 | 11/1906 | Stacks | 192/70.15 |
| 2,154,117 | 4/1939 | Wolfram | 192/70.14 |
| 2,180,086 | 11/1939 | Kraft | 192/70.14 X |
| 2,656,021 | 10/1953 | Butler | 192/107 X |

Primary Examiner—Benjamin W. Wyche
Attorneys—W. E. Finken and A. M. Heiter

ABSTRACT: A friction clutch having a rigid one-piece annular clutch pressure plate with a friction face having a large radius of curvature from the annular centerline of the annular friction face to its outer diameter and a larger radius from the annular centerline to the inner diameter to provide a curved friction surface to maintain a more constant area of contact at a more constant radius to improve clutch strength at high temperatures and to improve durability of the friction material by improving wear distribution.

PATENTED JUN 15 1971

3,584,719

INVENTOR.
Bobby G. Upchurch
BY
a.m. Heiter
ATTORNEY

CLUTCH WITH PRESSURE PLATE HAVING CONVEX FRICTION FACE

This invention relates to friction clutches and particularly an improved pressure plate friction face.

In conventional friction clutches having a rigid one-piece annular pressure plate with a flat annular friction surface engaging a flat annular face of the friction material on the driven plate, the flat annular friction surface on the pressure plate changes to a conical shape with the inner diameter further spaced from the mating friction surface face than the outer diameter. This creep or plastic deformation and the degree appear to be caused by centrifugal force acting on the protruding mass or the mass of the pressure plate spaced from the friction face, the temperature differential between the hotter outer diameter and the inner diameter caused by the greater circumferential friction contact distance and the above coning effect, the material and the severity of use of the clutch plate. Thus, as the clutch is used, and the pressure plate face becomes coned, the engaging pressure is concentrated at the outer diameter of the pressure plate and friction material causing a concentration of wear at the outer diameter of the friction material adversely affecting durability. Also, these clutch plates which are originally flat, as they become coned change the diameter of circumferential engagement line or area which results in a large change in wear distribution, and an increase in heat gradient.

In accordance with this invention, the annular friction face of the rigid one-piece pressure plate has a projecting fairing such as a convex curvature in a radial direction substantially about its annular or circumferential centerline near the mean radius so that initial contact between the pressure plate friction face and the flat friction face of the driven plate friction material is centralized in an annular area about the mean diameter of these annular friction faces. Then with subsequent use causing creep of the rigid pressure plate, the annular contact area between the pressure plate and the friction material is maintained substantially equal about and adjacent the mean diameter. As the driven plate friction material wears, its flat surface changes to a concavely curved surface similar to the convex curvature of the pressure plate to more equally distribute and increase the area of contact resulting in substantially full area contact providing improved durability. Also, because these mating surfaces are curved, changes in the position of the curved friction face of the pressure plate relative to the curved face of the friction material, due to creep, provides a region of contact very substantially constant in area and mean radius. Thus, this friction clutch has an improved durability and maintains torque capacity.

An object of this invention is to provide in a friction clutch, a rigid annular pressure plate having a friction face convexly curved about its mean diameter to provide a more stable and evenly distributed contact area and diameter of contact with the friction material during the life of the clutch for improved durability and increased strength at high temperatures.

Another object of the invention is to provide in a friction clutch, a rigid pressure plate having an annular friction face surface with a cross section over the outer diametral half of the annular friction face having a curved surface with a large radius and a cross section over the inner diametral half of the annular friction face having a curved surface with a larger radius.

Another object of the invention is to provide in a friction clutch, a rigid pressure plate having an annular friction face surface with a cross section over the outer diametral half of the annular friction face being a curved surface having a large radius and the cross section over the inner diametral half of the annular friction face being a curved surface having a larger radius where the proportion of the radius is substantially the same as the proportion of the circumferences of the inner diameter to the outer diameter of the friction face.

Another object of the invention is to provide in a friction clutch, a rigid pressure plate having an annular friction face surface having a cross section over the outer diametral half of the annular friction face with a curved surface having a large radius and a cross section over the inner diametral half of the annular friction face with a curved surface having a larger radius where the proportion of the radius is substantially the same as the proportion of the circumferences of the inner diameter to the outer diameter of the friction face and where the axial height of the friction face at the center above the friction face at the outer diameter is slightly larger than the creep induced movement of the outer diameter of the friction face so that the contact area between the pressure plate and friction face has a more stable area and mean radius throughout the life of the clutch.

These and other objects of the invention will be more apparent from the following description and drawing of a preferred embodiment.

Figures 1, 2, 3:
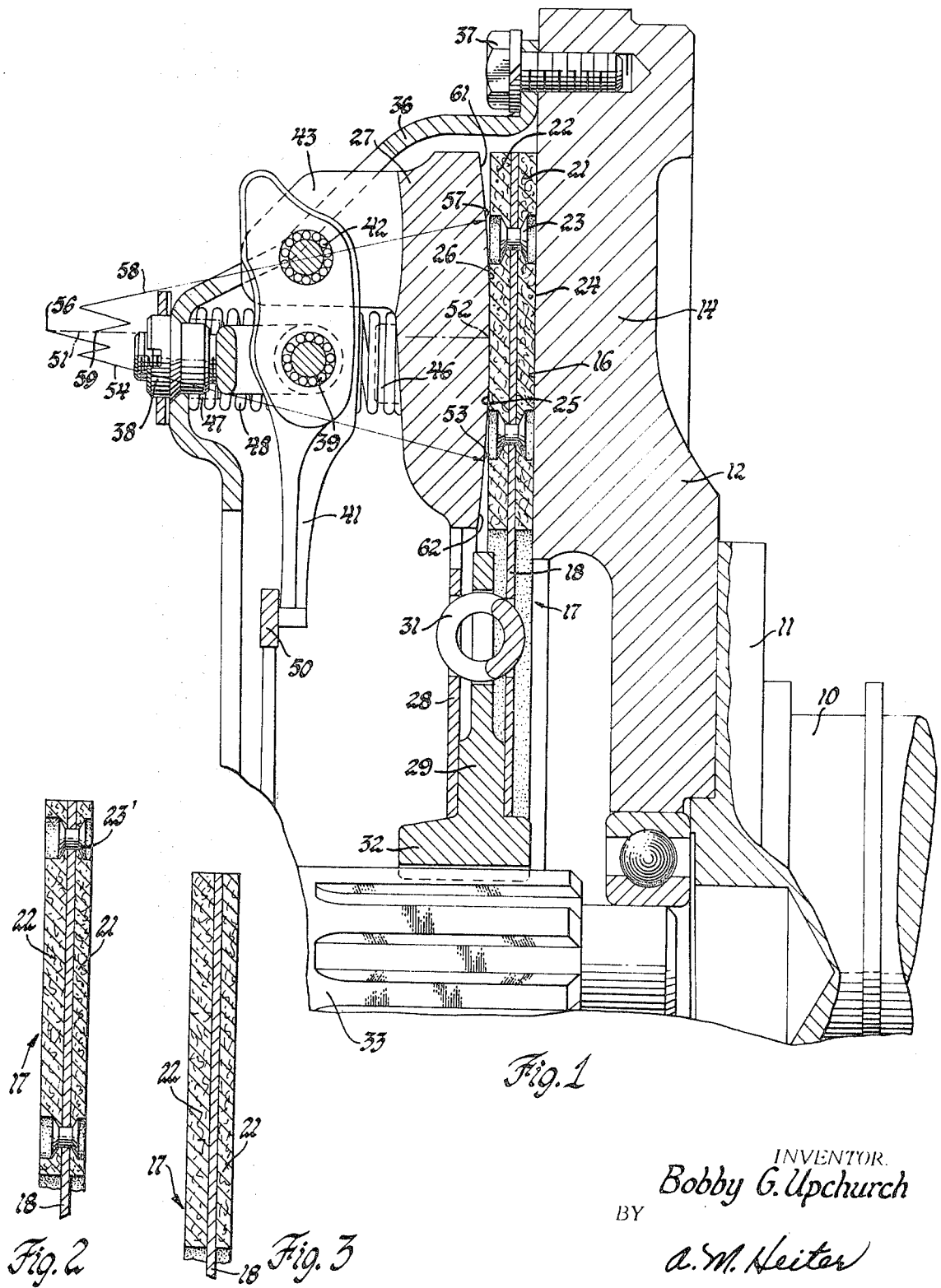
FIG. 1 shows a friction clutch having a contoured pressure plate.
FIG. 2 shows a modified clutch-driven plate.
FIG. 3 shows another modified clutch-driven plate.

The invention as illustrated in the clutch shown in FIG. 1 has an engine or input shaft 10, drivingly connected by the flange 11, which is secured to the flywheel 12 having a backing plate portion 14 providing a flat annular friction surface 16. The driven disc 17 has an annular central supporting member 18 to which the annular friction material facings 21 and 22 are attached by suitable rivets 23. An increased volume of available friction material volume may be obtained by locating the rivets 23' nearer the outer and inner diameters of the driven plate 17 as shown in FIG. 2 or by adhesive bonding the friction material facing members 21 and 22 to the supporting member 18. The facings 21 and 22 have flat annular surfaces with the surface 24 of friction material member 21 contacting the surface 16 and a flat annular surface 25 of member 22 positioned for contact with the curved surface 26 (described below) of the rigid pressure plate 27. The annular clutch support member 18 is supported by a conventional torsion vibration damper in which the annular plate 28 is secured to the plate 18 and locates the clutch on the hub flange 29 and confines the torsional damping springs 31. The hub flange 29 is secured or integral with hub 32 suitably splined to the output shaft 33. The cover plate 36 is secured by suitable bolts 37 to the flywheel and supports the posts 38 which have a bifurcated end supporting the pivot bearing 39 on which the clutch actuating lever 41 is pivotally mounted. The lever is connected by a pivot bearing 42 to the pair of ears 43 formed integrally with the pressure plate 27. There are three or more similar actuating lever assemblies spaced equally around the perimeter of the clutch. Between the actuating lever assemblies at the same or a smaller diameter than the ears the pressure plate has a plurality of spring seats 46 and the cover plate has a plurality of spring seats 47 on which the clutch apply springs 48 are mounted. The spring seats 46 may be hollow to reduce the protruding mass. The clutch is normally engaged by the clutch apply springs 48 and released when the throwout bearing 50 is moved toward the clutch to swing the lever counterclockwise to lift the pressure plate 27 away from the driven plate 17.

The pressure plate 27 is a rigid one-piece casting preferably made of nodular iron but may be made of grey iron or steel. The projecting faired friction surface 26 on the pressure plate 27 is preferably generally convexly curved or circular about one or more pivot points located a substantial distance back of the surface 26 on or near the centerline 51 through the mean circumference 52 of the surface 26 or the mating portion of surfaces 26 and 25.

This provides a rigid pressure plate friction surface 26 having a gentle convex curvature so the central region is higher than the inner and outer diameter portions 61 and 62. During initial clutch use, this higher central region contacts the mating initially flat friction material surface and the outer and inner diameter portions 61 and 62 are spaced therefrom. With continued use, the higher central region soon wears a complimentary concave cavity in the friction material and the outer and inner diameter portions 61 and 62 approach and wear the friction material surface 25 at an even rate in the outer and inner diameter portions during the life of the clutch.

After an initial wear-in period, and thus during substantially the major portion of the life of the clutch, the convexly curved pressure plate surface contacts the concavely curved friction material surface over substantially the full area. During the full life of the clutch the temperature gradient, and thus creep, is reduced and torque capacity is maintained. The convex curvature also appears to be important in reducing the adverse effect of creep in that with creep the convex curvature is reduced and so coning movement of the pressure plate is offset and due to its contacting a concave friction material surface substantially full contact is maintained for the life of the clutch. Thus, a larger volume of friction material is worn during the life of the clutch providing improved durability.

In the preferred form of the invention, the outer half 57 of surface 26 has a long radius 58 to the pivot point 59. The inner annular half 53 of the friction surface 26 has a longer radius 54 to its pivot point 56 of the main central axis 51. In one preferred embodiment a 12-inch clutch having a pressure plate having an outer diameter about 12 inches and an inner diameter about 7 inches the radially inner region radius of curvature is about 25 inches and the radially outer region radius of curvature is about 15 inches. So in this preferred embodiment the outer radius of curvature is about twice the inner diameter and the inner radius is about twice the outer diameter. Thus, it is preferred that the radius of curvature ratio be substantially equal the diameter ratio of the friction surface. This may be expressed as an inverse ratio, the ratio of outer radius of curvature to inner radius of curvature equals the ratio of the inner diameter of the friction surface to the outer diameter of the friction surface. With this arrangement, it will be seen that the initial engagement of the friction face 26 with the friction face 25 will be in the circumferentially central region about the mean circumference 52. The initial wear of the clutch will enlarge this region by forming a mating concave curve in the central region of the friction material in the face 25. During the life of the clutch, the reduced and partially offset creep of the pressure plate 27 will cause the outer diameter 61 of the friction surface 26 to move toward the friction surface 25 of friction member 22 and the inner diameter 62 of friction face 26 to move away from the friction surface 25 but the contact zone will maintain a more uniform contact area and radius during the life of the clutch. The radius 54 of the inner portion 53 is selected so that as creep occurs during the life of the clutch, moving the inner diameter 62 away from friction face 25 and outer diameter 61 toward friction face 25, there is little change in the area of the region of contact and its radius from the central axis of the clutch and shafts 10 and 33. The outer clearance is selected so the outer diameter is never higher than the central portion of the pressure plate and both the inner and outer edges evenly approach and finally contact the friction material for full contact. It is found that this is accomplished by selecting the inner and outer radiuses 54 and 58 so they are in substantially the same proportion as the outer diameter of circumference is to the inner diameter or circumference. Thus in the initial clutch construction before use, both clearances are less than the thickness of the friction material and the clearance at the inner diameter 62 bears the same proportional relationship to the clearance at the outer diameter 61 as the proportional relationship of the inner diameter to the outer diameter. The proportion of the circumferential distance at the inner diameter to that at the outer diameter is selected because this is proportional to the amount of heat generated in the inner region and the outer region. These radiuses and thus the clearances, particularly the clearance at the outer diameter, is selected so, even with creep during the life of the clutch, the inner and outer portions always have less height than the central region. Thus, as this clutch wears, the incremental contact area, or the region of contact, between the pressure plate and the friction material discs becomes greater due to the wear of the friction material of the driven disc forming a mating concave depression or cavity matching the convex surface of the pressure plate and due to the convexly curved pressure plate friction surface approaching a flat surface because of creep deformation. For these reasons durability of friction material is increased because a larger volume of friction material is worn away in the central concave cavity worn by this pressure plate as compared with the normal flat pressure plate engaging a flat friction surface which wears away a triangular portion of the friction material having in section the base at the outer diameter and the apex nearer the inner diameter.

This convexly curved pressure plate surface on a rigid one-piece pressure plate operating with an initially flat friction surface will decrease the operating heat gradient of the pressure plate due to a more even heat distribution extending from the clutch mean circumference to the outside and inside diameters to reduce creep. Due to the reduced temperature gradient and the convexly curved friction surface, the face 26 tends to become flatter, as the pressure plate creeps during its life, but the curvature is sufficient so that it does not become flat or coned during the life of the clutch. Furthermore, even if the convexly curved surface rotates bodily because of creep, due to the large curvature convex surface of the pressure plate and its tendency to wear a similar surface in the friction material, the area of the region of contact between these friction surfaces and the radius of this region from the clutch axis remains substantially stable to maintain the improved lower heat gradient thus reducing stresses caused by heat gradient and has substantially full contact to wear a larger volume of the friction material before wearing to the rivets for improved durability. It will be seen that with the rivets at the inner and outer diameter or a bonded facing as shown in FIGS. 2 and 3, further improvement in durability is obtained.

It will be appreciated that modifications of the above-described preferred embodiments may be employed to accomplish this invention.

I claim:

1. In a clutch, a plate having an annular friction material surface means, a rigid one-piece metal plate having its metal annular surface means facing said friction material surface, means for moving said plates toward each other to bring said surface means into contact with each other to transmit drive and for moving said plates away from each other to move said surface means out of contact with each other to disconnect said drive and said surface means in said drive disconnect position having minimum clearance between said surface means in a central annular region and increased clearance at the outer and inner diameters of said surface means for initial wear contact in an annular central portion of each of said surface means and substantial even expansion of said annular central portion for wear contact toward said inner and outer diameters.

2. The invention defined in claim 1 and said initial clearance at the outer diameter being greater than at the inner diameter.

3. In a clutch, a backing member having a friction surface, a driven plate having friction material means having a first friction surface engaging said surface of said backing member and a second friction surface having a flat annular surface, a rigid one-piece annular metal pressure plate having on one face thereof an annular friction surface convexly curved about the mid portion thereof with the highest portion in the middle circumferential region of the pressure plate and the inner and outer diameters having a lower height for initially contacting said second flat annular friction surface only in a middle circumferential region during the life of the clutch wearing a concave surface in said flat annular face of said second friction surface and means to move said pressure plate axially toward said backing plate to engage said driven plate and away from said backing plate to release said driven plate.

4. The invention defined in claim 3 and said convexly curved surface providing sufficient clearance between said second friction surface and friction surface of said pressure plate at the inner and outer diameter of contact for providing more uniform wear during the life of the clutch.

5. The invention defined in claim 3 and said convexly curved surface having a curvature in the outer diameter region greater than the curvature in the inner diameter region.

6. The invention defined in claim 3 and said convexly curved surface having the radius of curvature in an outer region bearing substantially the same proportion to the radius of curvature in an inner region as the diameter of the inner region to the diameter of the outer region.

7. The invention defined in claim 3 and said convexly curved surface having a curvature about a pivot point substantially on an axial centerline through the mean circumference of the mating portions of the convexly curved surface and said second friction material surface.

8. The invention defined in claim 3 and said convexly curved surface having a curvature in an outer region having a long radius of curvature to one pivot point and an inner region having a longer radius of curvature to another pivot point and both pivot points being substantially on an axis through the mean circumference of said convexly curved friction surface.

9. The invention defined in claim 3 and said convexly curved surface having a curvature substantially having radius ratios varying with diameter ratios with the radius decreasing from the inner diameter to the outer diameter and the radius pivot being located near an axis centrally located between the inner and outer diameters of the friction surface.

10. The invention defined in claim 3 and said convexly curved friction surface on said pressure plate having the outer diameter having a lower height than the inner diameter.

11. The invention defined in claim 3 and said convexly curved friction surface on said pressure plate when initially engaging said second flat friction material surface having a larger clearance at the outer diameter than at the inner diameter.

12. In a clutch, a driven plate having annular friction material means having a first and second annular friction material surface facing in opposite directions and a flywheel backing member having an annular friction surface contacting said first friction surface, a rigid one-piece annular metal pressure plate having on one face thereof an annular friction surface convexly curved throughout the area of contact with said second friction surface and having a midportion thereof higher than the inner and outer edge portions so that contact between said second friction surface and said convexly curved friction surface is only made initially in an annular central region and then expands substantially evenly toward the inner and outer diameters during the life of the clutch until full contact is achieved and means to move said pressure plate axially toward said backing plate to engage said driven plate and away from said backing plate to release said driven plate.

13. The invention defined in claim 12 and said outer region having a lower height than said inner region so said area of contact expands more evenly toward said outer and inner diameters.

14. The invention defined in claim 12 and said convexly curved surface having a curvature in an outer region having a long radius of curvature to one pivot point and an inner region having a longer radius of curvature to another pivot point and both pivot points being substantially on an axis through the mean circumference of said convexly curved friction surface.